UNITED STATES PATENT OFFICE 2,434,981

ORGANIC POLYHYDROXY COMPOUNDS AND DERIVATIVES

Joseph E. Bludworth and Donald P. Easter, Cumberland, Md., assignors to Celanese Corporation of America, a corporation of Delaware No Drawing. Application September 19, 1944, Serial No. 554,858

3 Claims. (Cl. 260—488)

This invention relates to novel organic compounds and relates more particularly to 1-(3,4-dihydroxycyclohexyl)-1,2-dihydroxybutanone,

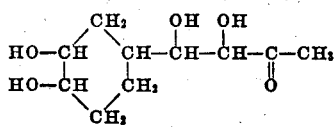

and to the ether and ester derivatives thereof, having the formulas

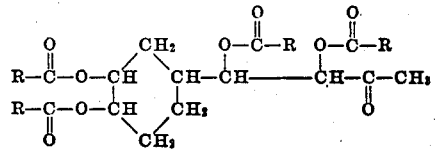

and

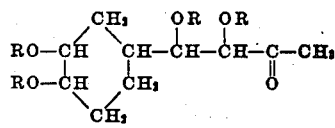

wherein R is an alkyl, cycloalkyl, aryl and aralkyl radical.

An object of our invention is the preparation of 1-(3,4-dihydroxycyclohexyl)-1,2-dihydroxybutanone, and the novel ether and ester derivatives thereof.

In accordance with the Diels-Alder reaction, the condensation of acrolein with butadiene yields $\Delta^3$-tetrahydrobenzaldehyde. On reacting this aldehyde with acetone in the presence of potassium hydroxide, $\beta$-($\Delta^3$-tetrahydrophenyl)-vinyl methyl ketone is formed,

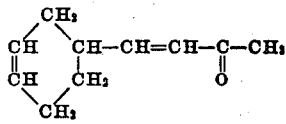

which yields many valuable compounds on further reaction.

We have now discovered that by effecting the oxidation of $\beta$-($\Delta^3$-tetrahydrophenyl)-vinyl methyl ketone, a novel higher molecular weight polyhydric alcohol may be obtained, namely, 1-(3,4-dihydroxycyclohexyl)-1,2-dihydroxybutanone.

As suitable oxidizing agents there may be mentioned potassium permanganate, hydrogen peroxide or sodium chlorate but the most desirable results are obtained employing potassium permanganate. The oxidation may be carried out at temperatures of from 0 to 15° C. When employing potassium permanganate as the oxidizing agent, the reaction is preferably allowed to proceed gradually, employing from 30 to 90 parts by weight of a 1 to 7% aqueous solution of the potassium permanganate, the reactants being held at a temperature of 0 to 5° C. for 1 to 4 hours and then allowed to rise to room temperature. The reaction may be completed by heating at about 100° C. for 1 to 3 hours. The 1-(3,4-dihydroxycyclohexyl)-1,2-dihydroxybutanone formed may be separated from the reaction by extraction employing a suitable water-immiscible solvent such as diethyl ether.

When esterified with suitable organic acids or etherified with suitable etherifying agents, this polyhydroxy compound yields novel ether and ester derivatives which are valuable for use as plasticizers, as intermediates in the preparation of higher molecular weight compounds and for other industrial applications.

In order further to illustrate our invention but without being limited thereto the following examples are given:

Example I 30 parts by weight of $\beta$-($\Delta^3$-tetrahydrophenyl)-vinyl methyl ketone are suspended in 200 parts of water and cooled to 5° C. A solution of 63 parts by weight of potassium permanganate in 1000 parts of water is added over a period of one and one-half hours while maintaining the temperature below 5° C. at all times. The mixture obtained is allowed to warm to room temperature, i. e. about 20° C., and then heated on a steam bath for one hour. The precipitated manganese dioxide is filtered off, the filtrate saturated with sodium sulfate and then extracted with ether. The ether extract is dried over anhydrous sodium sulfate and is then evaporated to remove the ether. The residue comprises impure 1-(3,4-dihydroxycyclohexyl)-1,2-dihydroxybutanone. The yield obtained is over 95% of theoretical. This compound is compatible with cellulose acetate and may be employed as a plasticizer therefor.

Example II 40.5 parts by weight of 1-(3,4-dihydroxycyclohexyl)-1,2-dihydroxybutanone are mixed with 80 parts by weight of acetic anhydride and boiled under reflux for one hour. After cooling, the mixture is extracted with ether, the ether evaporated off and the residue freed of water and acetic acid by heating at about 75° C. under 100 mm. pressure in a slow current of air. The compound obtained, 1-(3,4-diacetoxycyclohexyl)-1,2-diacetoxybutanone, is quite compatible with cellulose acetate and exerts a satisfactory plasticizing action thereon.

*Example III*

To a solution of 218 parts by weight of 1-(3,4-dihydroxycyclohexyl)-1,2-dihydroxybutanone in 350 parts absolute diethyl ether is added in small pieces 92 parts metallic sodium at such a rate as to keep the ether slowly refluxing. When the addition of sodium is complete, 252 parts of dimethyl sulfate are added with stirring, keeping the ether gently boiling. Cooling may be applied if the reaction tends to become violent during the initial stages of the addition. After the dimethyl sulfate has been added, the mixture is stirred and refluxed for one hour. The sodium sulfate is filtered out and the ether evaporated from the filtrate. The residue, 1-(3,4-dimethoxycyclohexyl)-1,2-dimethoxybutanone, can be purified by recrystallization from suitable organic solvents.

This procedure, yielding the completely methylated derivative, can be modified by reducing the amount of dimethyl sulfate employed to yield, on reaction partially methylated products which contain unreacted hydroxyl groups.

The 1-(3,4-dihydroxycyclohexyl)-1,2-dihydroxybutanone may be esterified with various other acids such as, for example, propionic, butyric, acrylic, succinic, phthalic and hexahydrobenzoic acid to produce valuable esters. As examples of ethers which may be formed there may be mentioned the methyl, ethyl, propyl, butyl, lauryl, and benzyl ethers and the ethers of such polyhydric alcohols as, for example, ethylene glycol, propylene glycol and glycerol.

It is to be understood that the foregoing detailed description is given merely by way of illustration and that many variations may be made therein without departing from the spirit of our invention.

Having described our invention, what we desire to secure by Letters Patent is:

1. 1-(3,4-diacetoxycyclohexyl)-1,2-diacetoxybutanone.

2. Process for the production of 1-(3,4-diacetoxycyclohexyl)-1,2-diacetoxybutanone, which comprises reacting 1-(3,4-dihydroxycyclohexyl)-1,2-dihydroxybutanone with acetic anhydride until the hydroxy groups present are replaced by acetyl radicals.

3. Process for the production of 1-(3,4-diacetoxycyclohexyl)-1,2-diacetoxybutanone, which comprises acetylating 1-(3,4-dihydroxycyclohexyl)-1,2-dihydroxybutanone with 1 to 3 parts by weight of acetic anhydride, the acetylation being effected by refluxing the mixture for from 1 to 3 hours.

JOSEPH E. BLUDWORTH.
DONALD P. EASTER.

REFERENCES CITED

The following references are of record in the file of this patent:

UNITED STATES PATENTS

| Number | Name | Date |
|---|---|---|
| 1,891,043 | Diels | Dec. 13, 1932 |
| 2,265,143 | Butenandt | Dec. 9, 1941 |

FOREIGN PATENTS

| Number | Country | Date |
|---|---|---|
| 508,526 | Great Britain | July 3, 1939 |